United States Patent Office 3,287,256
Patented Nov. 22, 1966

3,287,256
HYDROCRACKING PROCESS AND CATALYST ACTIVATION
Dean Arthur Young, Yorba Linda, Calif., assignor to Union Oil Company of California, Los Angeles, Calif., a corporation of California
No Drawing. Filed June 11, 1964, Ser. No. 374,263
17 Claims. (Cl. 208—111)

This invention relates to the catalytic hydrocracking of hydrocarbons to produce therefrom lower boiling hydrocarbons, boiling for example in the gasoline range. The invention is particularly directed to the provision of certain novel hydrocracking catalysts which have been presulfided and oxidized in such manner as to improve their hydrocracking activity.

Briefly, the new hydrocracking catalysts of this invention comprise a crystalline, zeolitic, molecular sieve cracking base containing a small proportion of a Group VIII metal hydrogenating component, preferably added by ion exchange, said catalyst having been presulfided at low temperatures with hydrogen sulfide, followed by a low-temperature oxidation step. It has been found that the low-temperature presulfiding-oxidizing technique brings about a substantial improvement in hydrocracking activity, particularly for hydrocracking high molecular weight polycyclic and/or open-chain hydrocarbons. Preferably the presulfiding and oxidizing steps are carried out under substantially anhydrous conditions. A still further preference is that the sulfiding treatment be applied to an ammonium form of the zeolitic catalyst. This ammonium form is then later converted (after the oxidation step) to a "decationized" and/or hydrogen form of the zeolite as by calcining or high temperature reduction. The resulting presulfided, oxidized and deammoniated zeolite catalysts are then ready for use in hydrocracking.

The catalysts of this invention are particularly effective for the hydrocracking of mineral oil feedstocks which contain substantial proportions of hydrocarbons boiling above about 700° F. Even with lower boiling feedstocks however there is a substantial benefit.

In my copending application, Serial No. 218,101, filed August 20, 1962 now U.S. Patent No. 3,197,398, I have shown that zeolitic hydrocracking catalysts can be improved in activity for hydrocracking aromatic hydrocarbons by initially incorporating the Group VIII hydrogenating metal in the form of a hydrous colloidal sulfide, e.g., by impregnation of the zoelitic base with a hydrosol of palladium sulfide. These sulfide-sol catalysts are not, however, substantially improved in paraffin hydrocracking activity. In my copending application, Serial No. 276,721, filed April 30, 1963, I have shown that the same zeolitic catalysts can be materially improved in paraffin hydrocracking activity if they are presulfided (preferably under substantially dry conditions) at low temperatures, below about 400° F. However, these dry-sulfided catalysts are not materially improved in activity for hydrocracking cyclic hydrocarbons.

The catalysts of this invention constitute an improvement over each type of sulfided catalyst described in the above-noted copending applications, in that they display a substantially higher activity for hydrocracking both paraffinic and cyclic hydrocarbons, as compared to the unsulfided forms. This result is not obtained when the sulfiding step or the oxidizing step is performed at temperatures above about 400° F.

It has recently been discovered that certain zeolitic molecular sieve compositions, e.g., those of the "Y" crystal type, constitute excellent hydrocracking catalysts when compounded by ion-exchange with Group VIII metal hydrogenation catalysts such as palladium. Ion exchange is normally effected by digesting the zeolite, either in its sodium or ammonium form, with a suitable salt of the hydrogenating metal wherein the metal appears in the cation. The ion-exchanged composite is then dried and preferably reduced with hydrogen, thus activating the catalyst. In theory, the resulting catalysts should contain the hydrogenating metal in the ultimate of homogeneous dispersion, i.e., in substantially mono-atomic distribution. It came as a distinct surprise to find that these catalysts do not in fact display the maximum possible activity for hydrocracking, but that a substantial increase in activity is obtained by the low-temperature sulfiding-oxidizing technique of this invention. The reason for this improvement is not clearly understood, but apparently the presulfiding either renders some of the latent cracking sites more accessible to high-molecular-weight hydrocarbons, and/or there may be brought about a more optimum distribution of the Group VIII metal with respect to active cracking sites. The low-temperature oxidation step appears to enhance the redistribution of the Group VIII metal. Still another possibility is that the presulfiding and/or oxidizing steps merely stabilize the active centers against unfavorable changes occurring during subsequent activation of the catalyst by hydrogen reduction.

The molecular sieve cracking bases of this invention are partially dehydrated, zeolitic crystalline compositions composed usually of silica, alumina, and one or more exchangeable cations such as sodium, hydrogen, magnesium, calcium, etc. They are further characterized by crystal pores of relatively uniform diameter between about 6 and 14 A. Several crystal forms of such molecular sieves are now available and suitable for use herein, e.g., those of the "B," "X," "Y" or "L" crystal types, or synethtic mordenite. It is preferred to employ molecular sieves having a relatively high $SiO_2/Al_2O_3$ mole-ratio, between about 3.0 and 10, preferably between about 4 and 8. In particular, the Y molecular sieves having crystal pore diameters of about 9 to 10 A., and wherein the $SiO_2/Al_2O_3$ ratio is about 4–6, are preferred.

Normally, these molecular sieves are prepared first in the sodium form, but it is preferred that most or all of the monovalent metal be ion exchanged out with a divalent metal, or with an ammonium salt followed by heating to decompose the zeolitic ammonium ions, leaving in their place hydrogen ions and/or exchange sites which have actually been decationized by further removal of water:

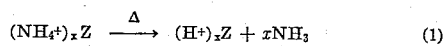

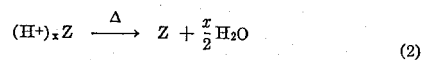

Mixed divalent metal-hydrogen zeolites may be prepared by ion-exchanging first with a ammonium salt, then partially back-exchanging with a divalent metal salt, and then calcining. In some cases, as in the case of synthetic mordenite, the hydrogen forms can be prepared by direct acid treatment of the alkali metal sieves. Y sieve zeolites of this nature are more particularly described in Belgian Patents Nos. 598,582, 598,682, 598,683 and 598,686, and U.S. Patent No. 3,130,006.

There is some uncertainty as to whether the heating of the ammonium zeolites produces a hydrogen zeolite or a truly "decationized" zeolite, but it is clear that, (a) hydrogen zeolites are formed upon initial thermal decomposition of the ammonium zeolite, and (b) if true decationization does occur upon further heating of the hydrogen zeolites, the decationized zeolites also possess desirable catalytic activity. Both of these forms, and the mixed forms, are designated herein as being "metal-cation-deficient."

The essential active metals employed herein as hydrogenation components are those of Group VIII, i.e., iron, cobalt, nickel, ruthenium, rhodium, palladium, osmium, iridium and platinum, or mixtures thereof. The noble metals are preferred, and particularly palladium and platinum. In addition to these metals, other promoters may also be employed in conjunction therewith, including the metals of Groups VIB and VIIB, e.g., molybdenum, chromium, manganese, etc.

The amount of hydrogenating metal in the catalyst can vary within wide ranges. Broadly speaking, any amount between about 0.1 and 20% by weight may be used. In the case of the noble metals, it is normally preferred to use about 0.2 to 2% by weight. The preferred method of adding the hydrogenating metal is by ion exchange. This is accomplished by digesting the zeolite, preferably in its ammonium form, with an aqueous solution of a suitable compound of the desired metal wherein the metal is present in a cationic form, as described for example in Belgian Patent No. 598,686.

If desired, the sulfiding operation may be carried out by simply bubbling hydrogen sulfide through the aqueous slurry resulting from the ion exchange of Group VIII metal onto the catalyst. But for best results, it is preferred to condition the ion exchanged catalyst for the sulfiding pretreatment by subjecting it to a substantial dehydration to reduce the water content to a level which is at least below the adsorption capacity of the catalyst, and preferably below about 10% by weight. The zeolite catalysts of this invention are strong adsorbents for water, and are generally capable of holding about 25–30% by weight of adsorbed water at atmospheric temperatures and pressures.

To reduce the water content of the catalysts to below about 30% by weight, either of two general procedures may be used. Firstly, the freshly exchanged catalyst, in its ammonium form, may be dried at relatively low temperatures, e.g., below about 300° F., in a dry stream of gas until the water content is reduced to, e.g., about 5–25% by weight. By this procedure the zeolitic ammonium content is not decomposed, and a sensibly dry form of the ammonium zeolite is obtained. Alternatively, the dehydration may be carried out at higher temperatures, up to about 700–1,000° F., in which case the ammonium ions are decomposed leaving a hydrogen and/or decationized form of the zeolite, while at the same time the water content can be reduced to below about 5% by weight. Either of these dehydrated forms may be subjected to presulfiding as described herein, but as previously noted, superior results are normally obtained when the ammonium form is presulfided. In those cases where a finished catalyst has already been obtained (i.e., one which has been previously heated to form the hydrogen and/or decationized zeolite), it may be reammoniated with dry ammonia gas at, e.g., 50–300° F. prior to the sulfiding-oxidizing treatment, and then reactivated by hydrogen reduction at, e.g., 600–900° F.

The sulfiding step is carried out by passing over or through the catalyst bed gaseous mixtures comprising hydrogen sulfide, or other readily decomposable organic sulfur compound, preferably in admixture with hydrogen, nitrogen or other inert gas. The treatment is continued for a sufficient time to bring about substantially complete sulfiding of the hydrogenating metal on the catalyst, normally about 30 minutes to 8 hours. Temperature is a critical factor during sulfiding. In general, temperatures below about 400° F., and preferably below 200° F., should be maintained, at least for the initial portion of the sulfiding operation. It has been found that where the sulfiding is carried out exclusively at high temperatures, e.g., above about 500° F., the finished catalyst has a substantially lower paraffin hydrocracking activity. It has also been observed that high pressures are detrimental during sulfiding, and it is hence preferred to utilize pressures of about 0 to 100 p.s.i.g. The combination of high temperatures and high pressures during sulfiding is most highly detrimental and should be avoided.

A typical presulfiding operation is carried out by passing a 1/1 mixture of hydrogen and hydrogen sulfide over the catalyst at room temperature and atmospheric pressure at the rate of about 40 s.c.f. per hour per cubic foot of catalyst for about 2 to 6 hours.

Following the presulfiding step, the catalyst is preferably purged of reactive gases such as hydrogen or hydrogen sulfide, and then oxidized at low ambient temperatures, below about 400° F., and preferably between about 40° and 200° F. Pressures are preferably atmospheric, but sub-atmospheric or super atmospheric pressures may be used, the preferred range being from about 0–100 p.s.i.g. The preferred oxidizing agent is air, but other oxygen-containing gases may be used, as well as ozone or other nonacidic gaseous oxidizing agents. A considerable amount of exothermic heat of reaction is generated during the oxidation, so that the actual catalyst temperature may rise temporarily above the 400° F. limit which is herein specified for the ambient oxidizing atmosphere. Care should be exercised, particularly in cases where the catalyst contains more than about 1% by weight of Group VIII metal, and/or where large bed volumes are being treated which restrict heat dissipation, to maintain the actual catalyst temperature below about 500° F. at all times. This can be controlled by using dilute oxidizing gases containing, e.g., 1–10% by volume of oxygen.

The oxidation step generally brings about a marked color change in the catalyst, usually to a bright yellow or brown, depending on the Group VIII metal present. The precise nature of the chemical changes brought about are not understood, but it is clear that the sulfur is not completely removed from the catalyst at this stage, for hydrogen sulfide is generated during the subsequent reduction and activation with hydrogen.

Following the oxidation step, it is normally desirable to subject the catalyst to a high-temperature reduction with hydrogen before contacting the hydrocarbon feedstock. Reduction may be accomplished at, e.g., 600–1,000° F. with a flowing stream of hydrogen, either at atmospheric or elevated pressures. If the catalyst still contains water prior to the reduction treatment, it is preferable to raise the temperature gradually in a hydrogen stream, and to maintain low pressures, e.g., atmospheric, until substantially all water is expelled from the catalyst, after which the pressure may be raised. The high temperature reduction treatment is essential in those cases where the catalyst has been sulfided in the ammonium form. The hydrogen reduction at high temperatures effects deammoniation and also removes sulfur from the catalyst. In some cases, it may be found difficult to remove all ammonia and sulfur, and in these cases it may be desirable to subject the catalyst to a high-temperature oxidation treatment at, e.g., 600–1,000° F., and then again reduce with hydrogen. The reduction step also brings about another color change in the catalyst, generally from a yellow or brown to gray or black. This is presumed to indicate the presence of polyatomic metallic aggregates on the exterior surface of the crystallites.

The finished catalysts of this invention may be employed for the hydrocracking of substantially any mineral oil fraction boiling above the gasoline range, i.e., above about 300° F., and usually above about 400° F., and having an end-boiling-point up to about 1,000° F., but preferably between about 700° and 850° F. These feedstocks may contain up to about 5% by weight of sulfur, and they may also contain organic nitrogen compounds. The presulfiding technique is of greatest benefit however, for hydrocracking in a sulfur-free system; this entails the use of feedstocks substantially free of sulfur, i.e., containing less than 0.1% by weight of sulfur. Specific feedstocks contemplated comprise straight-run gas oils and heavy naphthas, coker distillate gas oils and heavy naphthas, deasphalted crude oils, cycle oils derived from catalytic or thermal cracking operations and the like. Specifically, it is preferred to employ oils having an API gravity between about 25 and 35°, and containing at least about 20% by volume of cyclic hydrocarbonss.

Hydrocracking condition to be employed herein fall within the following ranges:

|  | Operative | Preferred |
|---|---|---|
| Temperature, °F | 400–850 | 500–750 |
| Pressure, p.s.i.g. | 400–5,000 | 750–2,000 |
| H₂/oil ratio, SCF/B | 1,000–15,000 | 2,000–10,000 |
| LHSV, V/V/Hr | 0.1–10 | 0.5–5 |

Depending upon the severity of the hydrocracking conditions, and the refractoriness of the feed, it will be observed that the activity of the catalyst will have declined considerably after a period of time ranging between a few hours to several months. When the activity has declined to an undesirable level, the flow of feedstock is terminated, and the catalyst is regenerated by combustion at, e.g., 400–1,000° F., according to conventional regeneration procedures.

Following regeneration, it is normally desirable to subject the regenerated catalyst again to the low-temperature sulfiding-oxidizing pretreatment before contacting feedstock.

The following examples are cited to demonstrate the critical effects of the novel features of this invention, but are not to be construed as limiting in scope:

Example I

A sodium Y molecular sieve, having a $SiO_2/Al_2O_3$ mole ratio of about 4.7 was converted to the ammonium form by exchanging several times with 10% ammonium nitrate at 200° F. The ammonium-Y-sieve was filtered, dried, and exchanged with a solution of tetraminepalladium nitrate containing 0.00333 gm. Pd/ml. Sufficient solution was used to add 0.50 weight-percent palladium to the sieve. The palladium-containing sieve was filtered, dried at 110° C., pelleted, and four catalysts were prepared therefrom as follows:

Catalyst A (unsulfided): A portion of the Pd-ammonium Y sieve pellets was reduced in flowing hydrogen for 16 hours at atmospheric pressure. The reduction was started at room temperature, gradually increased to 850° F. for four hours, and then held at 850° F. for 16 hours. Then the catalyst was oxidized with 2% oxygen in nitrogen for 8 hours at 850° F. Finally the oxidation was continued with pure oxygen for 8 hours at 850° F. The oxidized catalyst had a light tan color.

Catalyst B was prepared by saturating a portion of the Pd-ammonium Y sieve with hydrogen sulfide gas for 2 hours at room temperature. Then without intervening exposure to oxygen, the catalyst was reduced and oxidized at high temperatures as described above. The oxidized catalyst had a light tan color.

Catalyst C: Another portion of the Pd-ammonium Y sieve was saturated with hydrogen sulfide for 2 hours at room temperature. The sufided catalyst was then agitated with air for 2 hours at room temperature. The evolution of heat and formation of a bright yellow color indicated vigorous oxidation. The catalyst was then reduced and oxidized as described previously. The resulting color was dark gray.

(The final high-temperature oxidation step employed in the above preparations is not essential, but is utilized simply to be sure that final sulfur contents are the same in all cases.)

Catalyst C contained a maximum concentration of palladium agglomerates on exterior crystalline surfaces, as indicated by the gray color. The light color of Catalyst A shows that merely reducing and oxidizing without sulfiding, leaves the palladium mostly dispersed in the fine pore structure. Substantially the same result was obtained in the case of Catalyst B where the sulfiding was followed immediately by a reducing step.

The foregoing catalysts were then tested for hydrocracking activity, using a heavy naphthenic feedstock having the following characteristics:

| | | |
|---|---|---|
| Gravity | ° API | 28.5 |
| Engler distillation: | | |
| IBP | ° F | 610 |
| 10% | ° F | 770 |
| 50% | ° F | 835 |
| 90% | ° F | 910 |
| Max % | ° F | 962 |
| Alkanes | volume percent | 14 |
| Mononaphthenes | do | 38 |
| Polynaphthenes | do | 48 |

The results were as follows:

TABLE 1.—HYDROCRACKING AT 1,000 P.S.I.G., 8.0 LHSV, 20,000 S.C.F. H₂/B

| Catalyst No. | A | B | C |
|---|---|---|---|
| Activation treatment | H₂ Reduction | Sulfiding, Reducing | Sulfiding, Oxidizing, Reducing |
| Hrs. on-stream | 22–26 | 24–28 | 23–27 |
| Temp., °F | 700 | 699 | 699 |
| Liquid Recovery, vol. percent | 96 | 98 | 97 |
| Product Gravity, °API | 41.9 | 44.5 | 57.7 |
| Product Distillation, vol. percent of feed: | | | |
| 0–120° F | 10.7 | 13.9 | 21.4 |
| 120–360° (gasoline) | 25.7 | 28.4 | 49.0 |
| 360–500° | 11.7 | 8.0 | 6.3 |
| 500° +Botts | 47.6 | 47.1 | 20.3 |

The foregoing data clearly shows that the low temperature oxidation step employed for Catalyst C resulted in a much more active catalyst for hydrocracking, being almost twice as active as Catalysts A or B, as measured by gasoline synthesis.

Example II

Two mordenite-based catalysts were prepared by exchanging sodium mordenite ($SiO_2/Al_2O_3$ mole-ratio 10; Norton Company "Zeolon") several times with 10% ammonium nitrate until the sodium content was 0.14% Na₂O. The ammonium mordenite was dried and exchanged with tetraminepalladium nitrate to add 0.5% palladium. Catalyst D was prepared by filtering off the Pd-ammonium mordenite, drying at 220° F., pelleting, and activating by reducing for 16 hours in hydrogen at 850° F., and oxidizing for 24 hours at 850° F. The resulting catalyst had a light buff color. Catalyst E was prepared by saturating a portion of the Pd-ammonium mordenite (after drying at 220° F.) with hydrogen sulfide for 1 hour at room temperature. Heat evolved when the catalyst was thereafter exposed to air at room temperature. The resulting catalyst had a dark brown color, and was then pelleted and activated as in the case of Catalyst D. The final catalyst had a medium gray color. The resulting catalysts were then tested for hydrocracking activity, using n-dodecane as feed at about 600° F., 1,000 p.s.i.g., 8.0 LHSV, and 20,000 s.c.f. of hydrogen per barrel of feed. The results were as follows:

TABLE 2

| Catalyst No. | D | E |
|---|---|---|
| Product Gravity, °API | 67.0 | 76.3 |
| Summed C₃–C₉, vol. percent | 40.0 | 74.5 |

The above data clearly demonstrates that the low temperature sulfiding and oxidizing gave a much more active catalyst. Substantially similar differential results are obtained when other hydrocracking catalysts and feedstocks within the purview of this invention are substituted in the foregoing examples. It is therefore not intended that the invention should be limited to the details of the examples but broadly as defined in the following claims.

I claim:
1. A method for increasing the activity of a hydrocracking catalyst for hydrocracking both paraffinic and aromatic hydrocarbons, said catalyst comprising a crystalline, zeolitic, alumino-silicate molecular sieve cracking base combined with a minor proportion of a Group VIII metal hydrogenating promoter added as a soluble salt, which comprises subjecting said catalyst to a presulfiding treatment by contacting the same with hydrogen sulfide at a temperature below about 400° F., oxidizing the sulfided catalyst at temperatures below about 400° F. by contact with a gaseous oxidizing agent, and then reducing the oxidized catalyst with hydrogen.

2. A method as defined in claim 1 wherein a substantial proportion of the ion-exchange capacity of said zeolitic cracking base is satisfied by combined ammonium ions during said presulfiding treatment.

3. A method as defined in claim 2 wherein said presulfiding is carried out under substantially anhydrous conditions, and wherein the catalyst contains less than about 10% by weight of water when subjected thereto.

4. A method as defined in claim 1 wherein said oxidizing agent is essentially air.

5. A method as defined in claim 1 wherein said presulfiding and oxidizing steps are carried out at a temperature below about 200° F. and a pressure below about 100 p.s.i.g.

6. A catalyst composition comprising a zeolitic, alumino-silicate molecular sieve cracking base combined with a small proportion of a Group VIII metal hydrogenating promoter added as a soluble salt, said cracking base comprising a substantial proportion of ion-exchange sites selected from the class consisting of decationized exchange sites, hydrogen ion-satisfied exchange sites, and divalent metal-satisfied exchange sites, said catalyst having been presulfided, oxidized, and reduced in hydrogen as defined in claim 1.

7. A catalyst composition as defined in claim 6 wherein said molecular sieve cracking base is mordenite.

8. A catalyst composition as defined in claim 6 wherein said molecular sieve cracking base is a Y molecular sieve.

9. A process for hydrocracking a hydrocarbon feedstock containing both paraffinic and aromatic hydrocarbons which comprises subjecting said feedstock plus added hydrogen to hydrocracking conditions of temperature and pressure in contact with a catalyst comprising a zeolitic, alumino-silicate molecular sieve cracking base combined with a small proportion of a Group VIII metal hydrogenating promoter, said cracking base comprising a substantial proportion of ion-exchange sites selected from the class consisting of decationized exchange sites, hydrogen ion-satisfied exchange sites, and divalent metal-satisfied exchange sites, said catalyst having been prepared by ion-exchanging said Group VIII metal into an ammonium form of said zeolitic cracking base, followed by (a) sulfiding of the ion-exchanged composite with hydrogen sulfide at a temperature below about 400° F., (b) oxidizing the sulfided catalyst at a temperature below about 400° F. by contact with a gaseous oxidizing agent, and (c) reducing the oxidized catalyst in hydrogen at an elevated temperature to convert zeolitic ammonium ions to hydrogen ions.

10. A process as defined in claim 9 wherein said sulfiding step (a) is carried out at a temperature below about 200° F., a pressure below about 100 p.s.i.g., and under substantially anhydrous conditions, and wherein the catalyst contains less than about 10% by weight of water when subjected thereto.

11. A process as defined in claim 9 wherein said presulfiding and oxidizing steps are carried out at a temperature below about 200° F. and a pressure below about 100 p.s.i.g.

12. A process as defined in claim 9 wherein said Group VIII metal is a noble metal.

13. A process as defined in claim 9 wherein said Group VIII metal is palladium.

14. A process as defined in claim 9 wherein said molecular sieve cracking base is mordenite.

15. A process as defined in claim 9 wherein said molecular sieve cracking base is a Y molecular sieve.

16. A process as defined in claim 9 wherein said hydrocarbon feedstock comprises a substantial proportion of hydrocarbons boiling above about 700° F.

17. A process as defined in claim 9 wherein said oxidizing agent is essentially air.

References Cited by the Examiner
UNITED STATES PATENTS

| | | | |
|---|---|---|---|
| 3,169,106 | 2/1965 | Lefrancois et al. | 208—111 |
| 3,197,398 | 7/1965 | Young | 208—111 |
| 3,197,399 | 7/1965 | Wright et al. | 208—111 |

DELBERT E. GANTZ, *Primary Examiner.*

A. RIMENS, *Assistant Examiner.*